US010986311B1

(12) United States Patent
Noland et al.

(10) Patent No.: US 10,986,311 B1
(45) Date of Patent: Apr. 20, 2021

(54) THREE-WAY VIDEO VISITATION DETECTION USING FRAME DETECTION

(71) Applicant: Securus Technologies, Inc., Carrollton, TX (US)

(72) Inventors: Alexander Noland, North Richland Hills, TX (US); John Wange, Dallas, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 15/927,608

(22) Filed: Mar. 21, 2018

(51) Int. Cl.
*H04N 7/15* (2006.01)
*G06K 9/00* (2006.01)
*H04N 7/14* (2006.01)

(52) U.S. Cl.
CPC .......... *H04N 7/15* (2013.01); *G06K 9/00362* (2013.01); *H04N 7/147* (2013.01)

(58) Field of Classification Search
USPC ..................................................... 348/14.08
See application file for complete search history.

(56) References Cited

U.S. PATENT DOCUMENTS

| 8,761,353 | B1 * | 6/2014 | Apple | H04M 15/00 379/88.01 |
| 9,558,523 | B1 * | 1/2017 | Hodge | G06Q 50/26 |
| 2010/0205667 | A1 * | 8/2010 | Anderson | G06F 21/84 726/19 |
| 2012/0274736 | A1 * | 11/2012 | Robinson | H04N 7/15 348/14.16 |
| 2013/0179949 | A1 * | 7/2013 | Shapiro | G06F 21/10 726/4 |

\* cited by examiner

*Primary Examiner* — Amal S Zenati
(74) *Attorney, Agent, or Firm* — Fogarty LLP

(57) ABSTRACT

A system and method for preventing unauthorized inmate to inmate communications comprises establishing a video conferencing session between a first device and a second device. Video content is extracted from video conferencing session data received from the second device. One or more artifacts are identified in the video content. The artifacts indicate that a third device is a source of at least a portion of the video content. The artifacts comprise at least three layers of objects in the video content, wherein the layers are associated with different rates of variation in linear measurements of the objects. In other embodiments, multiple backgrounds are detected in the video conferencing session data.

21 Claims, 8 Drawing Sheets

THREE-WAY VIDEO VISITATION DETECTION USING FRAME DETECTION

BACKGROUND

Traditionally, jails and prisons have allowed inmates to contact friends and family via letters and telephone calls. However, friends and family were required to visit the facility to see an inmate in-person. More recently, jails and prisons have provided other visitation methods, such as videoconferences (video visitation) and online chat sessions, that allow inmates to have real-time contact with remote friends and family. Prior to allowing an inmate to contact someone outside the facility, jail or prison staff must first verify that the remote party is on the inmate's approved contact list. This is to prevent inmates from communicating with unauthorized individuals, such as gang members, or protected people, such as victims, witnesses, or court staff. However, because the jail or prison does not have control over the remote friend or family member, an authorized contact may improperly reroute inmate communications to unapproved contacts, such as by call forwarding, conference calling, or videoconferencing.

SUMMARY

The present invention is directed to preventing unauthorized inmate to inmate communications. In an example embodiment, a method comprises establishing a video conferencing session between a first device and a second device, extracting video content from video conferencing session data received from the second device, and identifying one or more artifacts in the video content, wherein the artifacts indicate that a third device is a source of at least a portion of the video content. The artifacts comprise at least three layers of objects in the video content, the layers associated with different rates of variation in linear measurements of the objects.

The linear measurements of the objects may be selected from the group consisting of a width, a height, a length, and a distance. The artifacts may comprise a body part. The artifacts in the video content may comprise a case, frame, display screen, or function buttons for a video conferencing device. The artifacts may comprise a participant surrounded almost entirely by a first background, wherein the first background is surrounded almost entirely by a second background. The first background and the second background may be differentiated from each other using color, lighting, or motion. The first background and the second background may be separated by a border object in the video content.

The artifacts may comprise a participant object and a first background that rotate together in the video content, wherein a second background in the video content does not rotate with the participant object and the first background. The second background may rotate in a direction opposite to the participant object and the first background or at a different speed than the participant object and the first background.

The method may further comprise generating an alert when the artifacts are identified in the video content. The method may further comprise terminating the video conferencing session when the artifacts are identified in the video content. The method may further comprise flagging a video conferencing session record for further analysis when the artifacts are identified in the video content.

In another embodiment, a video conferencing system comprises inbound video circuitry configured to extract video content from received video conferencing session data, and video analysis circuitry configured to identify one or more artifacts in the video content, wherein the artifacts indicate that a third device is a source of at least a portion of the video content.

The video conferencing system may further comprise an alert system configured to perform one or more of the following when the artifacts are identified in the video content: generate an alert; terminate the video conferencing session; and flag a video conferencing session record for further analysis.

The artifacts may comprise at least three layers of objects in the video content, the layers associated with different rates of variation in linear measurements of the objects. The artifacts may comprise a body part. The artifacts in the video content may comprise a case, frame, display screen, or function buttons for a video conferencing device. The artifacts may comprise a participant surrounded almost entirely by a first background, and the first background surrounded almost entirely by a second background. The artifacts may comprise a participant object and a first background that rotate together in the video content, and a second background in the video content that does not rotate with the participant object and the first background.

BRIEF DESCRIPTION OF THE DRAWINGS

Figure 1:
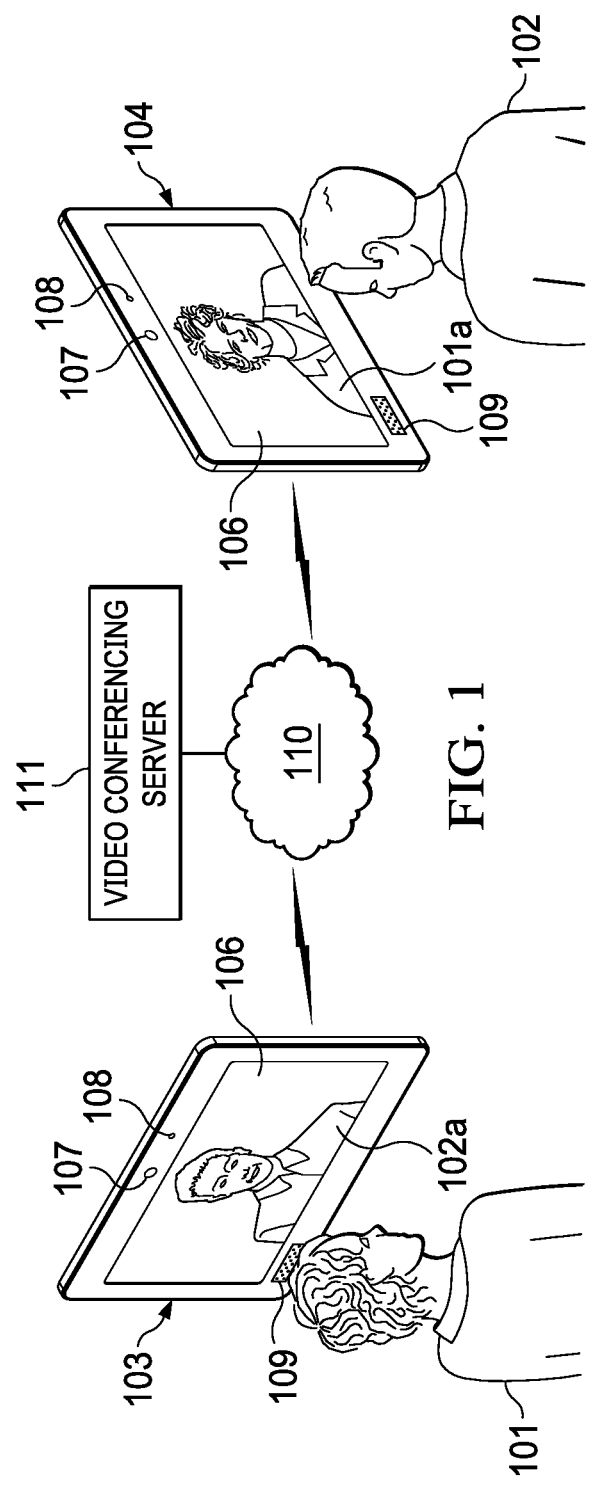

Having thus described the invention in general terms, reference will now be made to the accompanying drawings, which are not necessarily drawn to scale, and wherein:

FIG. 1 is simplified block diagram illustrating two individuals participating in a video conferencing or video chat session.

Figure 2:
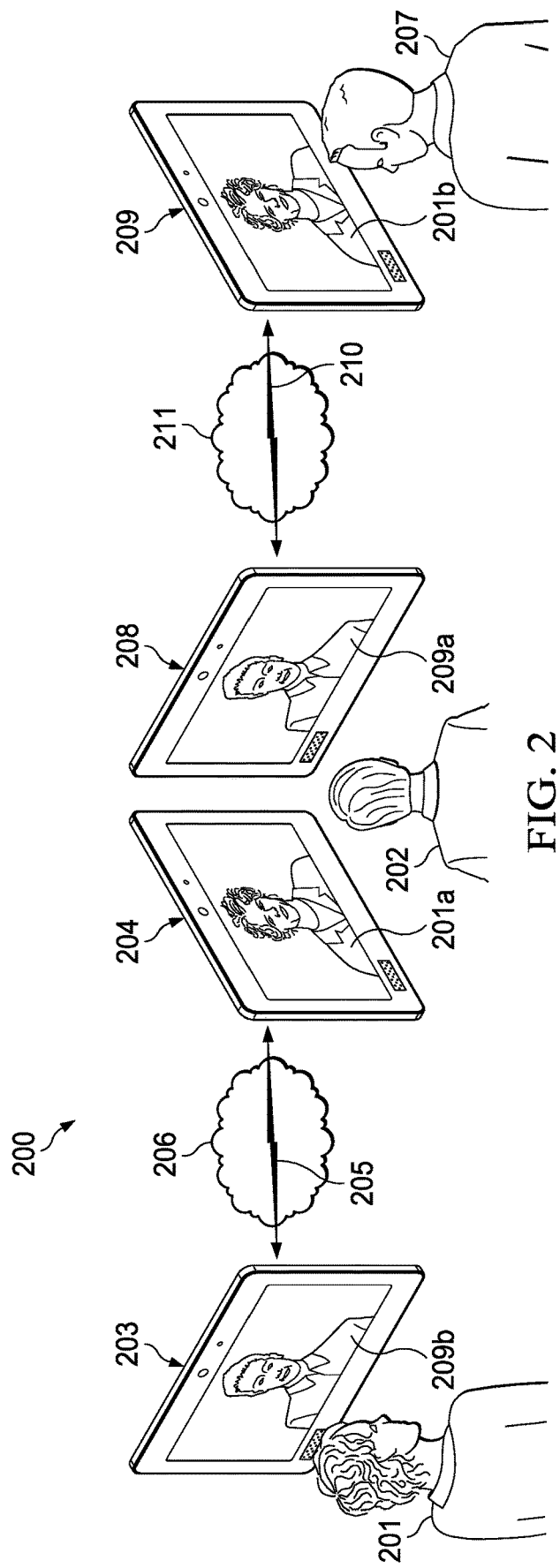

FIG. 2 is simplified block diagram illustrating a scenario in which two video conferencing sessions are manually linked together in a three-way video conferencing session.

Figure 3A:
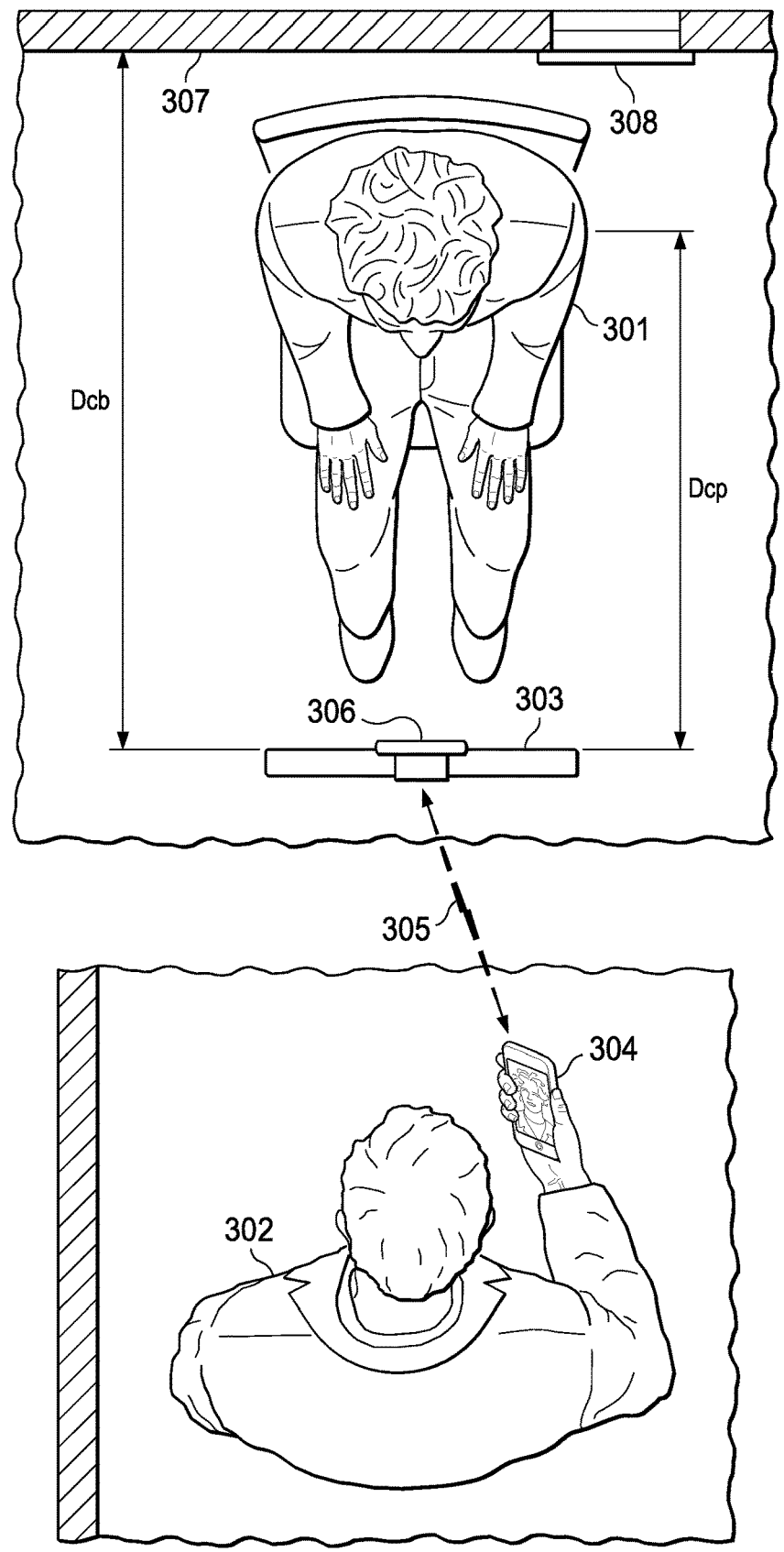

FIG. 3A is a simplified block diagram illustrating two individuals participating in a video conferencing session according to one embodiment.

Figure 3B:
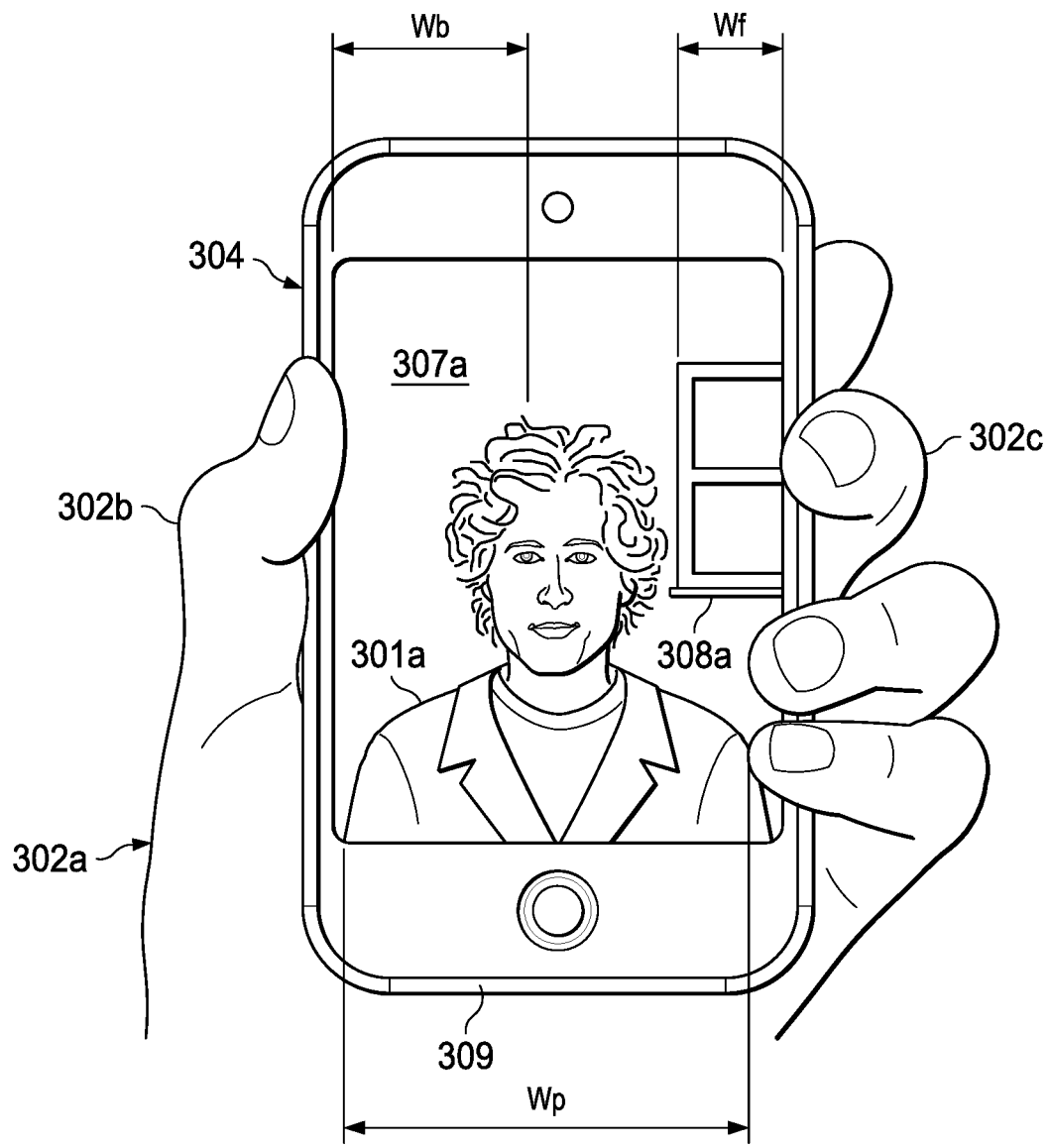

FIG. 3B illustrates the relevant field of view for a participant during a video conference.

Figure 4A:
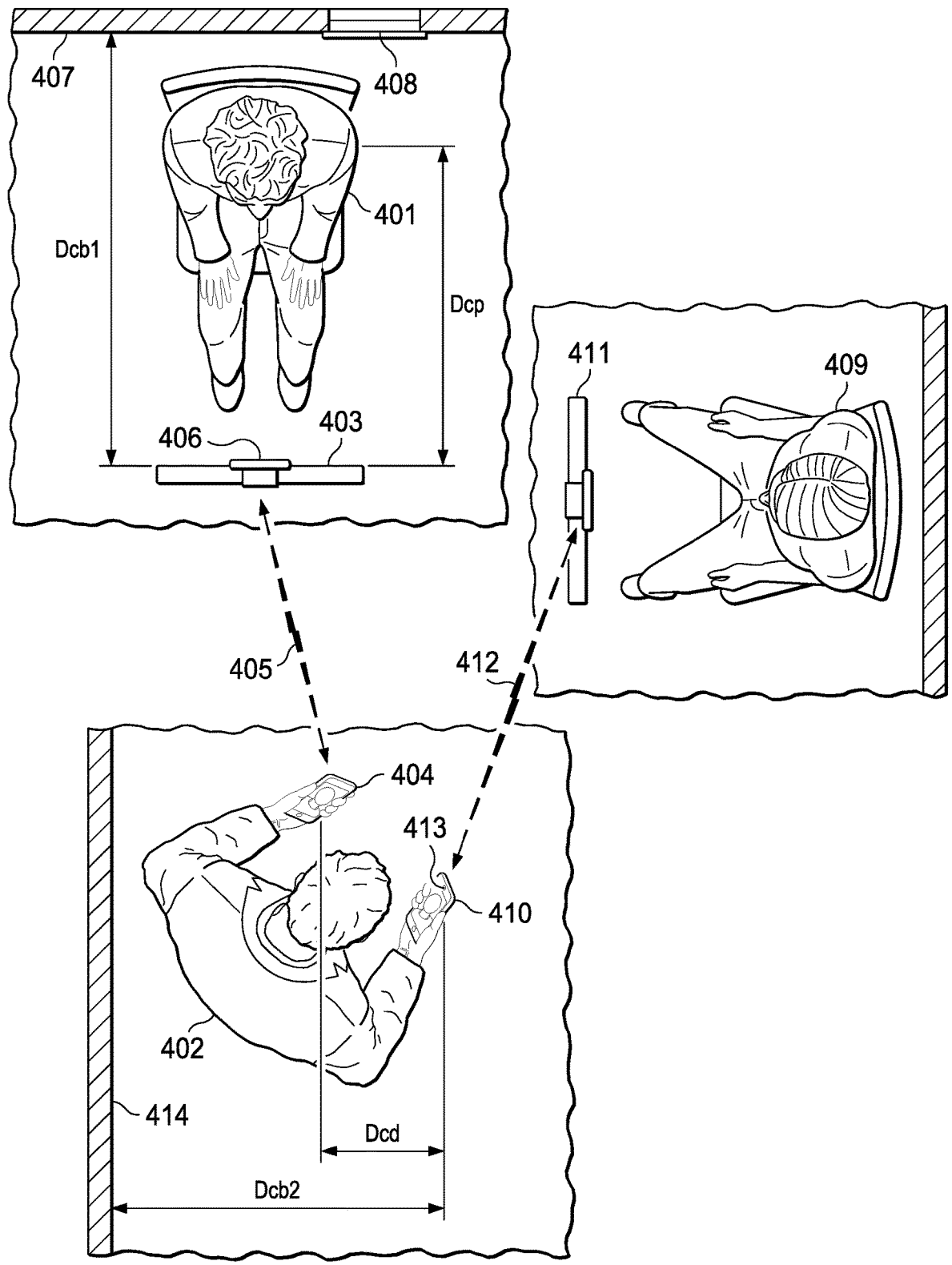

FIG. 4A is a simplified block diagram illustrating a scenario in which two video conferencing or video chat sessions are manually linked together in a three-way video conferencing session.

Figure 4B:
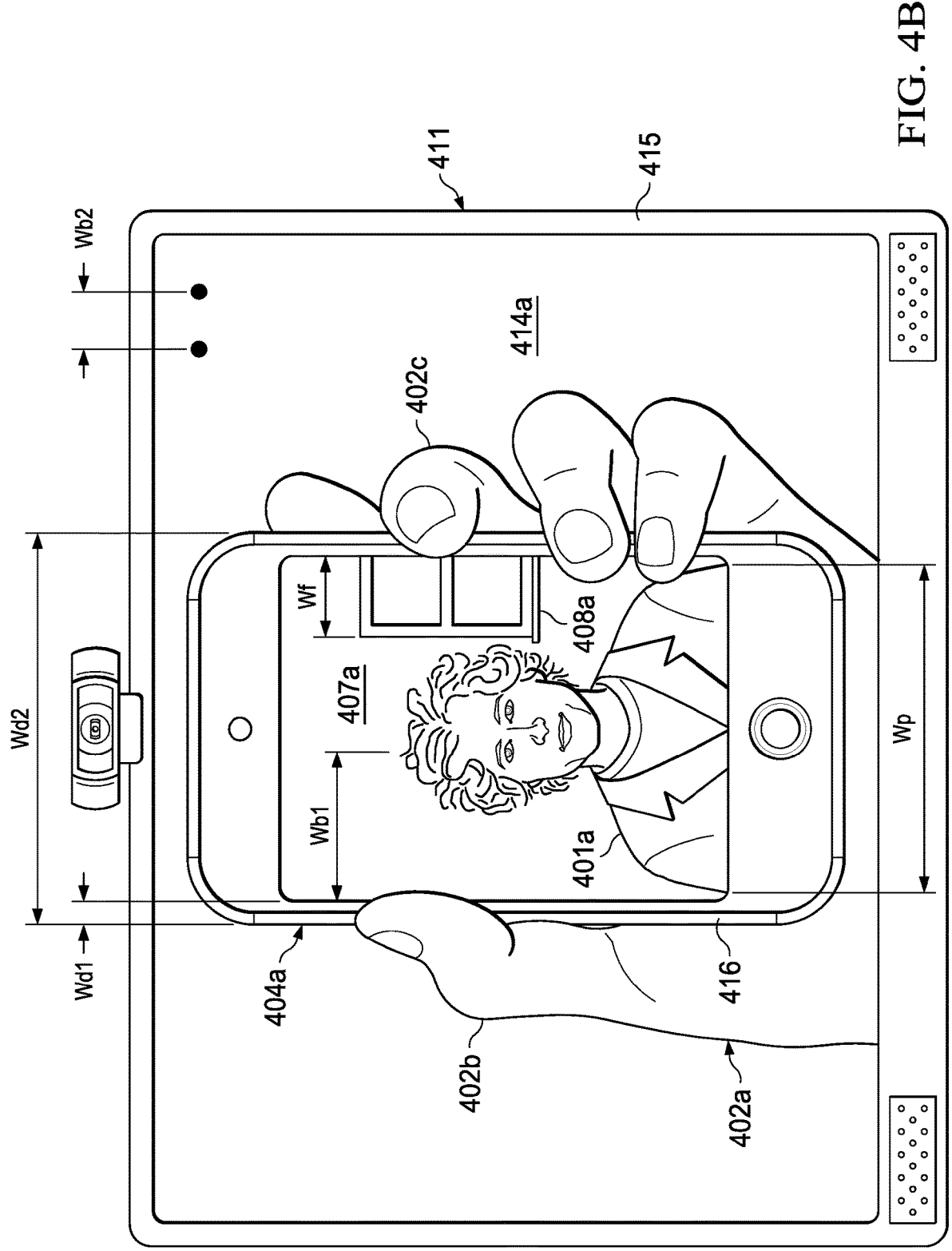

FIG. 4B illustrates the relevant field of view for a participant while participating in the three-way video conference.

Figure 5:
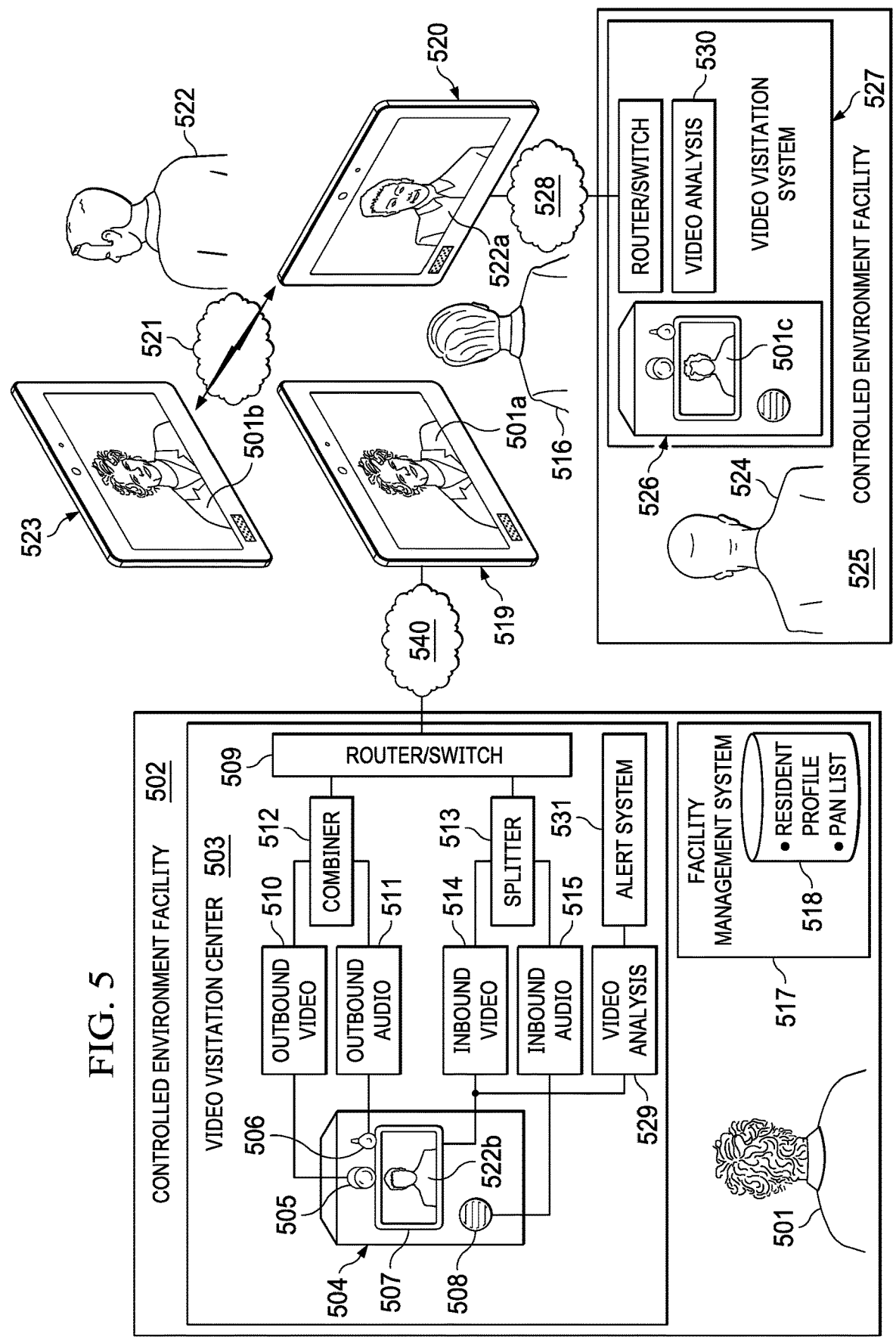

FIG. 5 is simplified block diagram illustrating a video visitation system for a controlled-environment facility in which two video conferencing or video chat sessions are manually linked together in a three-way video conferencing session.

Figure 6:
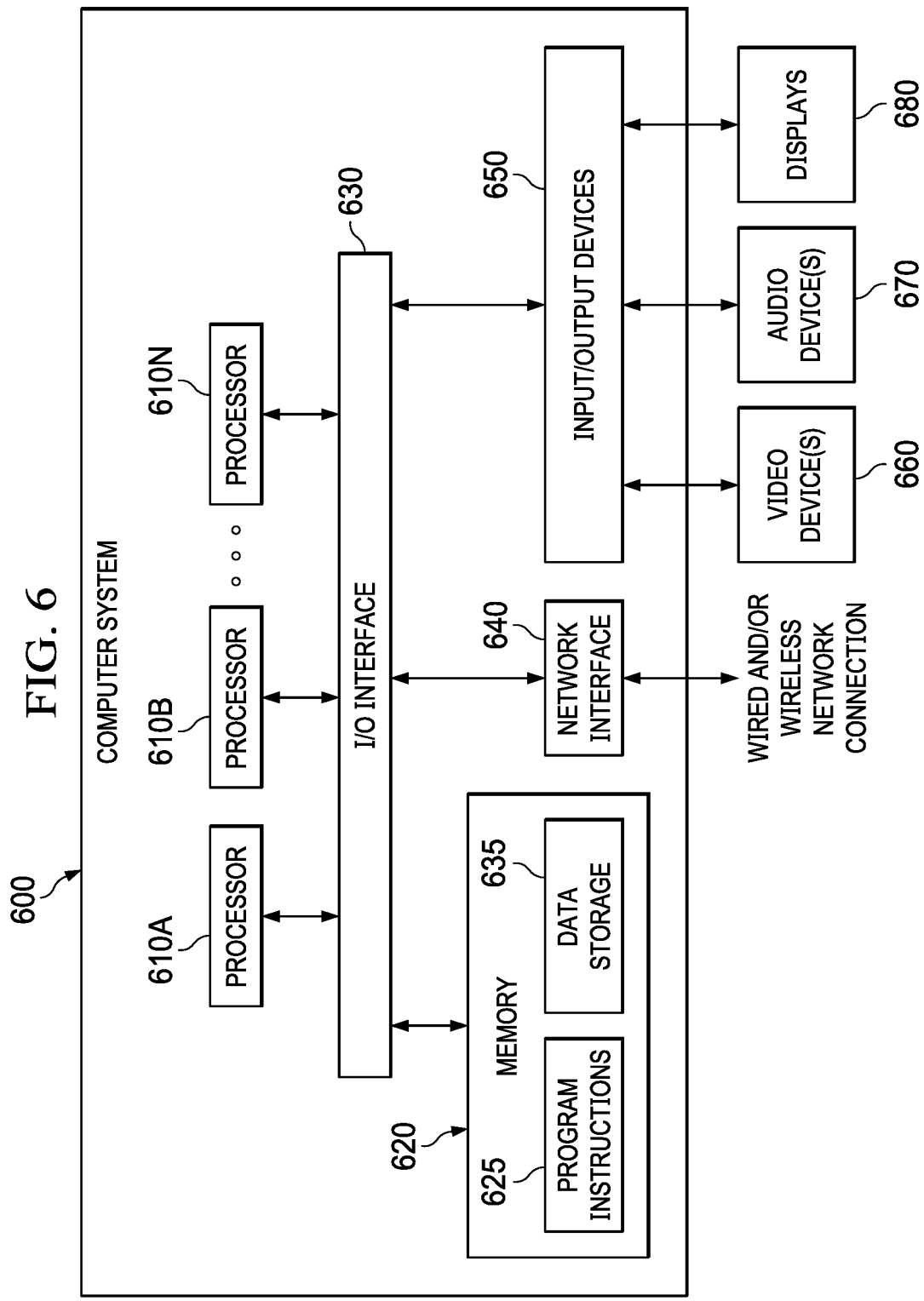

FIG. 6 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

FIG. 1 is a simplified block diagram illustrating two individuals 101, 102 participating in a video conferencing session. As used herein, the term video conference will be understood to refer to any live, visual connection between two or more people for the purpose of communication including, without limitation, video visitation, video chat, teleconference, or webinar. Participant 101 uses communication device 103, and participant 102 uses communication device 104. Devices 103, 104 may be the same or different types of devices. Devices 103, 104 may be, for example, a tablet, laptop, or desktop computer, smartphone, or a specialized video conferencing terminal, kiosk, or workstation, such as a processor-based self-service kiosk user terminal configured to communicate with an information management system to facilitate self-service acquisition of correctional facility information and services by a user thereof. Generally, devices 103, 104 have a screen 106 that displays video or still images captured by camera 107 on the other device. During a video conferencing session, for example, an image 102a of participant 102 is displayed to user 101 on device 103. Similarly, an image 101a of participant 101 is displayed to user 102 on device 104. Audio is captured via microphone 108 on each device, and then broadcast to the participant on the other device over speaker 109. The video conferencing session may be controlled by applications running on each device 103, 104. Video conferencing data is exchanged through one or more networks 110 that are in communication with devices 103, 104. Network 110 may be, for example, one or more of a wireless carrier network, landline telephone network, the Internet, an intranet, a wireless or wired Local Area Network (LAN), an enterprise network, and the like. A video conferencing server 111 may be used to facilitate setting up, initiating, and managing video conference sessions. Video conference server 111 may be centrally located or may be co-located with one of participant devices 103, 104. Each participant 101, 102 and their respective device 103, 104 may be located anywhere that provides access to network 110, which may be near to or remote from the other participant. In a typical video conference, an initiating participant 101 at device 103 calls the other participant 102's device 104 and, therefore, knows which device 104 is connected to the session.

FIG. 2 is a simplified block diagram illustrating a scenario in which two video conferencing or video chat sessions are manually linked together in a three-way video conferencing session 200. Participants 201, 202 use communication devices 203, 204 to establish a video conferencing session 205 across network 206. While videoconferencing session 205 is active, participants 202, 207 use communication devices 208, 209 to establish a video conferencing session 210 across network 211. Networks 206 and 211 may include the same or different networks. In the scenario illustrated in FIG. 2, participant 202 may or may not actively join video conferencing sessions 205, 210. Participant 202's key role in this scenario is to hold devices 204 and 208 in a face-to-face manner so that video and audio broadcast on one device is captured on the other and vice versa. This allows, for example, video displayed on device 204 to be captured by a camera on device 208 and audio broadcast by device 204 to be captured by a microphone on device 208. The net effect is to relay the video and audio that initiates at endpoints 203, 209 to the other endpoint so that participants 201, 207 can communicate with each other. Videoconferencing sessions 205 and 211 may be established in any chronological order (e.g., simultaneously, or either session established first) and may be initiated by any party (e.g., participant 202 may establish both sessions by contacting both other parties, or endpoint participants 201, 207 may establish individual sessions by both contacting middleman participant 202, or some other sequence).

As illustrated in FIG. 2, device 203 captures video of participant 201 as part of videoconferencing session 205, which is then displayed as image 201a on device 204. Device 208 then captures video of image 201a as part of videoconferencing session 210, which is then displayed as image 201b on device 209. Similarly, video of participant 207 is displayed as image 209a on device 208 and then captured and relayed to device 203 as image 209b. Audio is relayed between devices 203 and 209 in a similar manner. Even though participants 201 and 207 have not directly contacted each other, they are able to communicate directly via linked video conferencing sessions. As a result, it would not be readily apparent to either of endpoint devices 203, 209, networks 206, 211, or any related video conferencing servers or equipment that participants have created this three-way video conferencing session. This may a be problem in certain environments, such as in controlled-environment facilities, in which video conference participants 201 are only allowed to communicate with specific individuals (i.e., a whitelist) and/or are not allowed to communicate with other individuals (i.e., a blacklist). Three-way video conferencing session 200 allows participant 201 to avoid most protections that are in place to prevent unauthorized contact with participant 207. This three-way communication can be particularly problematic if the endpoint participants 201, 207 are both residents of controlled-environment facilities that are not allowed to communicate, either unsupervised or at all.

FIG. 3A is a simplified block diagram illustrating two individuals 301, 302 participating in a video conferencing session according to one embodiment. Participant 301 uses communication device 303, and participant 302 uses communication device 304. Device 303 may be a specialized video conferencing terminal, such as a processor-based self-service kiosk user terminal, and device 304 may be a handheld or mobile smartphone, tablet, or similar device. Participants 301, 302 are in different locations and video conference 305 is established between devices 303 and 304 using any currently known or later developed video conferencing technology, standard, or protocol. Either participant 301, 302 may initiate the video conference. To simplify the discussion herein, only one side of the video conference session (i.e., from participant 301 to participant 302) is described below; however, it will be understood that the same methods, techniques, and improvements may be applied to either or both sides of a video conference session. Moreover, these methods, techniques, and improvements may be applied to video conference sessions comprising more than two participants.

Device 303 comprises a camera 306 and any additional components, such as video displays, microphones, speakers, etc. required to support the video conference session as will be understood by those of ordinary skill in the art. Camera 306 captures images of participant 301 as well as other objects near participant 301, such as background 307 and other features 308 of the environment or room where participant 301 is located. Features 308 may include, for example, pictures, furniture, windows, doors, paint or wallpaper patterns, plants, animals, or other people.

FIG. 3B illustrates the relevant field of view for participant 302 during the video conference. Participant 302 sees his or her hand 302a that is holding device 304. Participant 302 may also see a case, frame, display screen, or function buttons on device 304. Device 304 is displaying video image 301a of participant 301 along with video images 307a and 308a of background 307 and features 308. Feature 308 in this example is a window or picture. Device 304 comprises a frame or case 309 surrounding a video display. Participant 302's thumb 302b, fingers 302c, or other body parts can also be seen holding device 304.

In the example of FIG. 3A, participant 301 is sitting at a self-service kiosk user terminal 303. Participant 302 uses mobile device 304 and may move to different locations during the video conference. In other embodiments, participant 301 may also use a handheld or mobile device and, therefore, may be able to move around during the video conference.

If camera 306 and/or background 307 move during the video conference (e.g., if device 303 is mobile or handheld or background 307 is not a fixed object), then the distance Dcb between camera 306 and background 307 will change. Similarly, if participant 301 and/or camera 306 move during the video conference, then the distance Dcp between camera 306 and participant 301 will change. The effect of such movement may be observed on the display of device 304, such as by changes in the size of participant 301, background 307, and/or feature 308. For example, as the distance Dcp changes, the width Wp of participant 301 will change proportionally on the device 304 display. If camera 306 and participant 301 move toward each other (i.e., if Dcp decreases), then the width Wp of participant 301 will increase as he or she fills more of the device 304 display.

Similarly, as the distance Dcb changes, the width Wb of background 307a or width Wf of feature 308a will change on the device 303 display. For example, if camera 306 moves toward background 307 (i.e., Dcb decreases), then the width Wb of background 307a and the width Wf of feature 308a will increase as they fill more of the device 304 display. An example width Wb in background 307a may be, for example, a distance between two arbitrary points, such as points in a pattern or structure in background 307. It will be understood that in other embodiments, feature 308 may or may not be an integral part of or attached to background 307.

Distance Dcp is proportional to width Wp (Dcp α Wp), and distance Dcb is proportional to width Wf (Dcb α Wf). During a typical video conference, the widths of the participant 301a and the background/features 307a, 308a may change at different rates, such as if the background does not move but the participant does. A video conferencing system may process the video signal for session 305 to detect and monitor the widths of various objects. For example, an object, such as participant 301, background 307, or feature 308, may be detected in the video signal 305 using known video recognition techniques. Changes in the size of the objects indicate a change in distance relative to the camera. In one embodiment, the width of the objects may be measured using pixels. By measuring the width of an object as a number of pixels at periodic intervals, changes in the object's width can be detected. The rate of such changes can also be determined. Objects having different width-rate changes can be sorted as being at different distances from the camera.

By grouping objects into relative distances, the video conferencing system may identify different layers within the video. These layers correspond to objects at different distances. Typically, there would be two primary layers in the video signal for a video conference a participant layer and a background layer.

FIGS. 3A and 3B can be related to the configuration of FIG. 1, wherein the video conference is a one-to-one communication. FIGS. 4A and 4B are related to the configuration of FIG. 2, wherein a three-way communication has been established. The layer detection illustrated in FIGS. 3A and 3B can be expanded to identify additional layers in a three-way communication.

FIG. 4A is a simplified block diagram illustrating a scenario in which two video conferencing or video chat sessions are manually linked together in a three-way video conferencing session. Participants 401, 402 use communication devices 403, 404 to establish video conferencing session 405. Device 403 comprises a camera 406 that captures images of participant 401 as well as other objects near participant 401, such as background 407 or features 408 of the environment or room. While videoconferencing session 405 is active, participants 402, 409 use communication devices 410, 411 to establish a second video conferencing session 412. The two video conferencing sessions 405, 412 may be established on the same or different networks.

Participant 402's key role in the scenario of FIG. 4A is to hold devices 404 and 410 in a face-to-face manner (i.e., screen-to-screen) so that audio and video broadcast on one device is captured by the other device and vice versa. This allows, for example, video displayed on device 404 to be captured by camera 413 on device 410, which has the effect of relaying the video image of participant 401 to participant 409 at device 411. In addition to capturing the image displayed on device 404, camera 413 also captures other objects near device 404, such as background 414 or other features of the environment where participant 402 is located.

Participants 401, 402, 409 may be in different locations and video conference sessions 405, 412 may be established using any currently known or later developed video conferencing technology, standard, or protocol. Any participant 401, 402, 409 may initiate either video conference session 405, 412 in any order. Participant 402 might or might not actively join either video conference session 405, 412.

FIG. 4B illustrates the relevant field of view for participant 409 while participating in the three-way video conference. Device 411 has a case or frame 415 surrounding a screen that is displaying video captured by camera 413 on device 410. Participant 402's hand 402a is shown holding device 404a. Participant 402 may also see a case, frame, display screen, or function buttons on device 404a. Device 404a in turn displays video 401a of participant 401 along with background 407a and features 408a captured by camera 406. Device 404a comprises a frame or case 416. Participant 402's thumb 402b, fingers 402c, or other body parts are shown hold the frame 416 of device 404a. There are two backgrounds shown in FIG. 4B. Background 407a originates at the location of participant 401, and background 414a originates at the location of participant 402 and device 404.

In most cases, a human observer looking at FIG. 4B would immediately identify a three-way video conference. This would be obvious due to factors such as the presence of two different backgrounds, the frame of device 404, the hand holding device 404, etc. Only one of these features would be required for a human observer. However, human observers are not available to monitor all video conference sessions in real-time. Instead, automated methods are required to detect when a three-way video conference has or may have been established.

Referring to FIG. 4A, measurement Dcb1 represents the distance between camera 406 and background 407 and/or feature 408, and measurement Dcp represents the distance between camera 406 and participant 401. Similar distances are shown for camera 413. Measurement Dcb2 represents the distance between camera 413 and the background 414 behind device 404, and measurement Dcd represents the distance between camera 413 and device 404.

These distance measurements are proportional to the widths of the objects displayed on device 411 in FIG. 4B. Width Wp is proportional to distance Dcp, and width Wf is proportional to distance Dcb1. The width of displayed device 404a can be measured as either the width of the frame Wd1 or the width of the entire device Wd2. Both device widths Wd1, Wd2 are proportional to distance Dcd. The width of background 414 can be represented using the width of any feature in background 414 or by the distance between two arbitrary points, such as points in a wallpaper or painted pattern on background 414. These widths can be used in one embodiment to automate detection of three-way video conferences.

As the distance Dcb1 changes, the width Wb1 of background 407 or width Wf of feature 408 will change. For example, if camera 406 moves toward background 407 (i.e., Dcb1 decreases), then the width Wf of feature 408a will increase as it fills more of the display on device 404a. Also, as the distance Dcp changes, the width Wp of participant 401a will change. For example, if participant 401 moves toward camera 406 (i.e., Dcp decreases), then the width Wp of participant 401a will increase as it fills more of the display on device 404a. Changes in the width or size of objects displayed on actual device 404 will cause the same changes on displayed device 404a that is shown on device 411.

The changes in distances relative to camera 413 (Dcd, Dcb2) are independent of changes in distances relative to camera 406 (Dcp, Dcb1). As the distance Dcb2 changes, the width Wb2 of background 414a will change in display of device 411. Additionally, movement between devices 404 and 410 changes the distance Dcd, which in turn changes the widths Wd1 and Wd2 of device 404a as displayed on device 411. Each of these widths may change at different rates, which indicate additional layers in the display—a second background layer, and a device layer.

In one embodiment, the width of the objects may be measured using pixels. A video conferencing system may process the video signal for session 412 to detect and monitor the widths of various objects. For example, objects, such as participant 401a, background 407a, device 404a, and background 414a, may be detected in the video signal 412 using known video recognition techniques. Changes in the size of the objects indicate a change in distance relative to the camera. By measuring the width of an object as a number of pixels at periodic intervals, changes in the object's width can be detected. The rate of such changes can also be determined. Objects having different width-rate changes can be sorted as being at different distances from the camera or as different layers. For example, if participant 401 moves toward camera 406 and participant 402 moves devices 404 and 410 toward each other, then the widths Wcp, Wcb1, Wcb2, and Wd will all change at different rates (ΔWcp, ΔWcb1, ΔWcb2, and ΔWd). By grouping objects into relative distances, the video conferencing system may identify different layers within the video. These layers correspond to objects at different distances. Typically, there would be two primary layers in the video signal for a video conference—a participant layer and a background layer. In the case of a three-way video conferencing session, additional layers are in the video signal, such as a second background layer, and/or a device layer. The presence of additional layers in the video signal for a video conference session indicates that a three-way video conferencing session has been detected.

Although the width (or the rate of change of a width) of a participant, background, or feature is used in the example above, it will be understood that changes in height or other linear measurements may be used. These changes in linear measurements of a participant, background, or features at the receiving end may be used to determine proportional distance of objects or participants to the camera on the broadcasting end.

FIG. 5 is simplified block diagram illustrating a video visitation system for a controlled-environment facility in which two video conferencing or video chat sessions are manually linked together in a three-way video conferencing session. Resident 501 is located in controlled environment facility 502. Video visitation system 503 allows residents to communicate with family, friends, attorneys, and others outside the controlled environment facility 502 and provides the user interface for video visitation system 503. Resident visitation terminal 504 has a camera 505 for capturing video or still images of resident 501 and a microphone 506 for capturing audio from resident 501. Incoming video and images from remote participants are presented on display 507 and incoming audio is played through speaker 508. A router or switch 509 connects the video visitation system 503 to networks 540 to support communications with remote participants. Video captured by camera 505 is processed by outbound video circuit 510, and audio captured by microphone 506 is processed by outbound audio circuit 511. Combiner circuit 512 combines the video and audio information into the appropriate format for transmission to remote videoconferencing participants across network 540. Incoming videoconference information from network 540 is received at router or switch 509 and routed to splitter 513, which provides inputs to inbound video circuit 514 and inbound audio circuit 515. The incoming video and audio signals are then broadcast to resident 501 using display 507 and speaker 508, respectively.

Video visitation system 503 may provide authentication and authorization services while establishing new video conferencing sessions. For example, when resident 501 initiates a new video conference session to a called party 516, video visitation system 503 may access a facility management system 517 to authenticate resident 501 and to verify that resident 501 is authorized to contact called party 517. Facility management system 517 may be a jail management system (JMS) or a law enforcement agency management system (AMS) associated with the controlled-environment facility 502 that has data about the residents. Facility management system 517 has a database 518 comprising resident profile data, which may include a personal allowed numbers (PAN) list, a whitelist, or a blacklist that identifies allowed and/or restricted contacts for the user. The contacts listed in the resident's profile may identify particular individuals, devices, and/or telephone numbers/addresses that resident 501 is allowed to contact or restricted from contacting. If the designated called party 516 or called device 519 is authorized for resident 501, then video visitation system 503 will establish a video conference session between resident visitation terminal 504 and called device 519 thereby allowing resident 501 and called party 516 to communicate.

It will be understood that in other embodiments, the remote party 516 may initiate a video visitation session by calling video visitation system 503 at controlled-environment facility 502, which will verify authentication and authorization before establishing the video conference session. Furthermore, it will be understood that video visitation system 503 and the embodiments disclosed herein may be compatible with any now known or later developed standard, protocol, or codec, such as, for example, Session Initiation Protocol (SIP), H.523, International Telecommunication Union's (ITU) H.264, VP8, Real-Time Video codec, WebRTC, or Object Real-Time Communications (ORTC).

As noted in reference to FIG. 2, problems can arise if called party 516 facilitates a three-way video conference call. Called party 516 may use a second device 520 to establish a second video conference session across network 521 to third party 522 at device 523. By holding devices 519 and 520 screen-to-screen, called party 516 can allow resident 501 to communicate directly with third party 522. The image 501*a* of resident 501 as displayed on device 519 is relayed as image 501*b* on device 523 along with the audio from resident 501. Similarly, the image 522*a* of third-party 522 on device 520 is relayed to the video visitation system 503 and displayed as image 522*b* to resident 501 along with audio from third party 522.

FIG. 5 further illustrates a second three-way video conference session embodiment in which the remote third-party resident 524, who is located at controlled-environment facility 525 and using resident visitation terminal 526 on video visitation system 527. Instead of establishing a second video conferencing session with third party 522, called party 516 may have established the second video conferencing session via network 528 with resident 524. It is unlikely that residents 501 and 524 should be allowed to communicate with each other if they are in restricted facilities such as jails or prisons. However, called party 516 could allow resident 501 to communicate directly with resident 524 by holding devices 519 and 520 screen-to-screen. This would allow video (501*c*) and audio from resident 501 to be broadcast on resident visitation terminal 526. Similarly, images 522*a*, 522*b* would represent video of resident 524 that was relayed to resident 501.

Absent additional protections or processing, video visitation system 503 itself would be unaware of the second video conferencing session between called party 516 and third party 522 and would not know that called party 516 has linked the two video conferencing sessions. Since a controlled-environment facility may have many video visitation sessions for different residents running concurrently, and given that a three-way video conference session could be established at any time on any of those resident sessions, it would be helpful to automate detection of such three-way video conference sessions so that the facility 502 does not have to manually monitor all sessions at all times.

In one embodiment, the video visitation system analyzes inbound video signals using a video analysis circuit 529, which processes the received session data to identify objects and layers within the video content. In video visitation system 527, video analysis circuit 530 processes the received video content to identify objects and layers. The presence of the excess layers in the video content, such as the detection of three or more layers when only two layers are expected, indicates that a three-way video visitation session may have been established. Video visitation sessions for controlled-environment facility 502 may be recorded. The video conference session data may be analyzed in real-time or recorded video visitation sessions may be analyzed after they are completed.

If a three-way video visitation session has been established by called party 516, the video analysis circuit 529 will detect video content such as the example displayed on device 411 in FIG. 4B. Video analysis circuit 529 processes the incoming video content and searches for cues, such as multiple layers of video, that indicate a three-way video visitation session. When a three-way video conference session is detected, then alert system 531 is notified to flag the video session recording for further review and/or to alert an investigator or facility staff that a three-way visitation session is in progress. Alert system 531 may take further action, such as terminating the video visitation session. Controlled-environment facilities 502, 525 may be the same or separate facilities. If they are the same facility, then video analysis components 529, 530 may be the same device within the same video visitation system 503, 527. Each video visitation system 503, 527 may serve multiple resident visitation terminals 504, 526 at each location.

It will be understood that the components of video visitation systems 503, 527 may be any appropriate devices for processing video conferencing session data and related video and audio content. Outbound video circuit 510, outbound audio circuit 511, combiner circuit 512, splitter 513, inbound video circuit 514, inbound audio circuit 515, video analysis circuit 529, and video analysis circuit 530 may be separate, discrete circuits or one or more of the components may be combined in the same device. The components may be discrete analog circuits, general use processors running specialized software applications, or specialized digital circuits or processors designed to perform the functions related to processing video conferencing session data and related video and audio content.

In other embodiments, video analysis circuit 529 identifies three-way videoconference sessions using techniques other than multiple layer detection. For example, referring to FIG. 4B, the video analysis circuit 529 may analyze the video content for certain artifacts that suggest that a three-way videoconference session is in progress. Examples of such artifacts include, without limitation, a body part, such as hand 402a, or an internal border, such as frame 416. If such an artifact is detected in the video content, video analysis circuit 529 may notify alert system 531 that it is likely that a three-way videoconference session is in progress.

In other embodiments, video analysis circuit 529 identifies three-way videoconference sessions by recognizing multiple backgrounds in the video content. For example, referring again to FIG. 4B, the video analysis circuit 529 may detect a participant object 401a, first background 407a, and second background 414a. The video analysis circuit 529 may apply known video recognition techniques to separately detect these objects with the video content, such as by recognizing differences in color, lighting, or motion between first background 407a and second background 414a. When a participant 401a appears to be surrounded almost entirely by a first background 407a, and first background 407a is in turn surrounded almost entirely by a second background 414a, then it may be likely that a three-way videoconference session is in progress. If an internal border, such as device frame 416, is detected between first background 407a and second background 414a, then this may increase the probability that a three-way videoconference session has been detected.

In other embodiments, video analysis circuit 529 identifies three-way videoconference sessions by recognizing rotational differences in the video content. It would be difficult for participant 402 to keep devices 404 and 412 perfectly aligned. So, when participant 402 twists device 404 and/or 410, the video analysis circuit 529 may detect that a participant object 401a and a first background 407a rotate together, but that a second background 414a does not rotate or rotates in the opposite direction or at a different speed. When such relative rotational discrepancies occur, then it may be likely that a three-way videoconference session is in progress. If an internal border, such as device frame 416, is detected as rotating relative to second background 414a, then this may increase the probability that a three-way videoconference session has been detected.

Although the video conferencing sessions illustrated herein are two-party sessions, it will be understood that any number of parties may be a participant to the separate video conferencing sessions that are joined into a three-way session. For example, in FIG. 4A, any one or more of video conferencing sessions 405 and 412 may involve two or more parties (e.g., session 405 may be a multi-party teleconference, and session 412 may be a separate multi-party teleconference).

Embodiments of the present systems and methods for detection of three-way video conference sessions, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, smartphone, media player, or the like. For example, in some cases, computer 600 may be used as, or as part of, one or more of video conferencing devices 103, 104, 203, 204, 208, 209, 303, 304, 403, 404, 410, 411, or 504, 519, 520, 523, 526 or video visitation systems 503, 527, and/or the like. In various embodiments two or more of these computer systems may be configured to communicate with each other in any suitable way, such as, for example, via a network (e.g., via networks 110, 206, 211, 540, 521, or 528).

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. In multi-processor systems, each of processors 610 may commonly, but not necessarily, implement the same architecture. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations, such as, for example, those described in connection with FIG. 1 through 5, above, may be stored within system memory 620 as program instructions 625 and data storage 635, respectively. In other embodiments, program instructions and/or data may be received, sent or stored upon different types of computer-accessible media or on similar media separate from system memory 620 or computer system 600. A computer-readable medium may include any tangible or non-transitory storage media or memory media such as magnetic or optical media—e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing or other data transformations to convert data signals from one component (e.g., system memory 620) into a format usable by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages. Data storage 635 may include data that may be used in these embodiments. In other embodiments, other or different software elements and data may be included.

A person of ordinary skill in the art will appreciate that computer system 600 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:

1. A method, comprising:
   establishing a video conferencing session between a first device and a second device;
   extracting video content from video conferencing session data received from the second device;
   identifying three layers of physical objects in the video content, the layers each associated with different rates of variation in linear measurements of the physical objects, presence of the third of these layers identifying that a third device is a source of at least a portion of the video content.

2. The method of claim 1, wherein the linear measurements of the physical objects are measured as a number of video pixels.

3. The method of claim 1, wherein the linear measurements of the objects are selected from the group consisting of a width, a height, a length, and a distance.

4. The method of claim 1, wherein at least one of the physical objects comprises a body part.

5. The method of claim 1, wherein at least one of the physical objects in the video content comprises a case, frame, display screen, or function buttons for a video conferencing device.

6. The method of claim 1, wherein the physical objects comprise a participant comprising one of the three layers, the participant surrounded almost entirely by a first background comprising a second of the three layers, and the first background surrounded almost entirely by a second background comprising a third of the three layers.

7. The method of claim 6, wherein the first background and the second background are also differentiated from each other using color, lighting, or motion.

8. The method of claim 6, wherein the first background and the second background are also separated by a border object in the video content.

9. The method of claim 1, wherein a first of the three layers comprise a participant object and a second of the three layers comprises a first background that rotate together in the video content, and a third of the layers comprises a second background in the video content that does not rotate with the participant object and the first background.

10. The method of claim 9, wherein the third layer second background rotates in a direction opposite to the first layer participant object and the second layer first background or at a different speed than the first layer participant object and the first background.

11. The method of claim 1, further comprising:
    generating an alert when the third device is identified as the source of at least a portion of in the video content.

12. The method of claim 1, further comprising:
terminating the video conferencing session when the third device is identified as the source of at least a portion of the video content.

13. The method of claim 1, further comprising:
flagging a video conferencing session record for further analysis when the third device is identified as the source of at least a portion of the video content.

14. A video conferencing system, comprising:
inbound video circuitry configured to extract video content from received video conferencing session data; and
video analysis circuitry configured to identify three layers of physical objects in the video content, the layers each associated with different rates of variation in linear measurements of the physical objects, presence of the third of these layers identifying that a third device is a source of at least a portion of the video content.

15. The video conferencing system of claim 14, further comprising:
an alert system configured to perform one or more of the following when the third device is identified as the source of at least a portion of the video content:
generate an alert;
terminate the video conferencing session; and
flag a video conferencing session record for further analysis.

16. The video conferencing system of claim 14, wherein the linear measurements of the physical objects are measured as a number of video pixels.

17. The video conferencing system of claim 14, wherein at least one of the physical objects comprises a body part.

18. The video conferencing system of claim 14, wherein at least one of the physical objects in the video content comprises a case, frame, display screen, or function buttons for a video conferencing device.

19. The video conferencing system of claim 14, wherein the physical objects comprise a participant comprising one of the three layers, the participant surrounded almost entirely by a first background comprising a second of the three layers, and the first background surrounded almost entirely by a second background comprising a third of the three layers.

20. The video conferencing system of claim 14, wherein a first of the three layers comprise a participant object and a second of the three layers comprises a first background that rotate together in the video content, and a third of the layers comprises a second background in the video content that does not rotate with the participant object and the first background.

21. A computer readable non-transitory medium having program instructions stored thereon that upon execution by a video conferencing system, cause the video conferencing system to:
establish a video conferencing session between a first device and a second device;
extract video content from video conferencing session data received from the second device; and
identify three layers of physical objects in the video content, the layers each associated with different rates of variation in linear measurements of the physical objects, presence of the third of these layers identifying that a third device is a source of at least a portion of the video content.

* * * * *